No. 732,598. PATENTED JUNE 30, 1903.
L. STEINBERGER.
CLIP.
APPLICATION FILED SEPT. 12, 1902.
NO MODEL.

WITNESSES:
Edward Thorpe.
Walton Harrison

INVENTOR
Louis Steinberger
BY
ATTORNEYS

No. 732,598. Patented June 30, 1903.

UNITED STATES PATENT OFFICE.

LOUIS STEINBERGER, OF BROOKLYN, NEW YORK.

CLIP.

SPECIFICATION forming part of Letters Patent No. 732,598, dated June 30, 1903.

Application filed September 12, 1902. Serial No. 123,115. (No model.)

*To all whom it may concern:*

Be it known that I, LOUIS STEINBERGER, a citizen of the United States, and a resident of the city of New York, borough of Brooklyn, in the county of Kings and State of New York, have invented new and useful Improvements in Clips, of which the following is a full, clear, and exact description.

My invention relates to clips of the kind used for suspending wires, cables, and other electric conductors.

My invention relates more particularly to the production of a cheap, simple, and efficient clip, which may be placed at any desired angle relatively to the hanger-wires and owing to the locking device may be secured in a permanent and reliable manner.

With many of the clips now used there is difficulty in maintaining the ear or analogous device engaging the wire or cable in proper alinement relatively to the hanger-wires and to other parts. For instance, if a clip is provided with a screw-socket and is screwed upon a threaded bolt it is difficult to cause the clip to assume the proper angle when fully screwed upon the bolt. Frequently when the clip is tightly secured in position the ear will not be in line with the wire or cable, and this fact leads to various expedients, such as the use of bushings, whereas by using my clips no such trouble will occur, as they can be readily adjusted at any desired angle and fixed permanently and in a reliable manner.

Reference is to be had to the accompanying drawings, forming a part of this specification, in which similar characters of reference indicate corresponding parts in both the figures.

Figure 1:
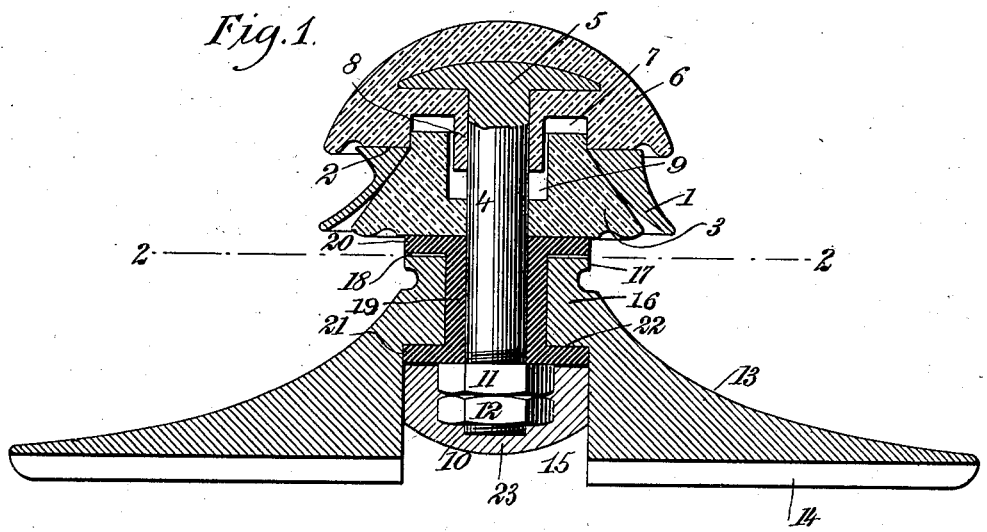
Figure 2:
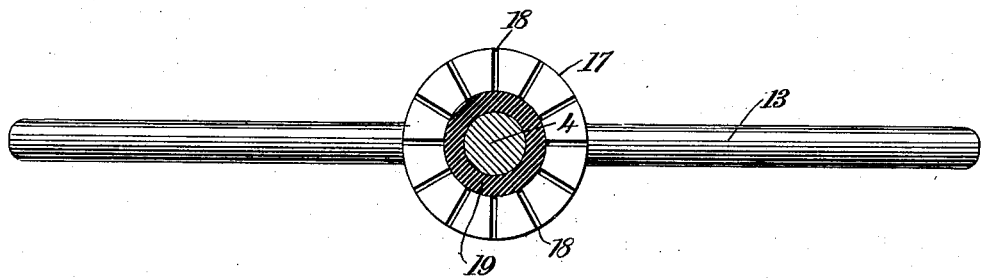

Figure 1 is a central longitudinal section through my device, and Fig. 2 is a section upon the line 2 2 of Fig. 1.

A metallic yoke 1, made, preferably, of iron, is suspended in the usual manner and provided with a flat annular surface 2. A conical member 3 of insulating material is fitted into the metallic yoke 1. A bolt 4 is provided with a head 5, which is surrounded by a semicircular dome-like member 6 of insulating material, provided with an annular groove 7, in which the upper end of the conical member 3 enters, as indicated in Fig. 1. The dome-like member 6 rests upon the flat surface 2 of the yoke 1. An insulating-sleeve 8 is integrally connected with the dome-like member 6 and engages the bolt 4 directly, said sleeve 8 loosely entering an annular aperture 9 between the bolt 4 and the cone 3. The lower end of the bolt 4 is provided with a thread 10, and engaging this thread are the nuts 11 12.

The clip proper is shown at 13 and is provided with flanges 14, which may be crimped or bent upon the cable or wire to be suspended. The clip is provided with an aperture 15 for the purpose of holding the nuts 11 12, which constitute a locking device. The clip 13 is provided with an integral neck or socket 16, terminating in a bearing-face 17, as indicated more particularly in Fig. 2. The bearing-face is provided with mutilations 18, whereby it is rendered uneven. A sleeve 19, of soft rubber, is provided with flanged ends 20 21 and is forced into the socket 16 by being doubled upward at one of its ends and then allowed to resume its former shape. The flanged ends 20 21 engage the bearing-face 17 and an annular shoulder 22, this shoulder being one of the surfaces of the aperture 15. A filling 23, of insulating material, preferably a cap of soft rubber, is filled upon the nuts 11 12 in the aperture 15, as shown in Fig. 1.

The operation of my device is as follows: The clip 13 being mounted as above described, the sleeve 19 not only serves as an insulator between the bolt 4 and the clip 13, but likewise serves to cushion the relative movements between the bolt and the clip. It will be understood that as the trolley passes along under the cable or wire there is some tendency for the one end or the other of the clip to be tilted slightly, and upon this account it is desirable that the clip shall have a slight movement relatively to the supporting members. The rubber sleeve serves as a cushion for this purpose and allows a certain resiliency in the clip.

In devices of this character it frequently happens that the swinging of the trolley-pole or the movements of the hanger-wire through the agency of the wind will cause the bolt to work loose from the threaded socket of the clip as ordinarily used. In my device, however, as the socket 16 is smooth and the bolt passes entirely through it the clip is unable to work loose, for the reason that the nuts 11 12 may be tightened relatively to each other and the clip 13 may be given just so much play that the slight movements of the clip relatively to the mountings have no tendency to loosen the clip. Furthermore, the resiliency of the sleeve 19 is ordinarily sufficient to allow for slight twisting motion, such as might be due to the starting of the trolley-pole without any tendency to unscrew the clips.

It will be noted that the aperture 15 is of such size that the lock-nuts may be readily removed when desired. Either or both of the nuts 11 12 may be passed laterally into the aperture and screwed upon the thread 10 while the clip is on the line, thus affording a very desirable feature of adjusting the resiliency of the clip to any desired tension. It will be also noted that clips constructed as herein shown and described are doubly insulated from the hanger or span wires, thereby preventing leakage or grounding of the current.

The clip may be adjusted relatively to the hanger and locked permanently in any desired position previous to being applied on the line. After being so locked it may be further and completely insulated by applying the insulating material 23 above described, thus lessening any possible chance for leakage of the current.

I do not limit myself to the use of nuts of the kind shown. Any other locking device which may be passed into the aperture 15 and made to engage the bolt 4 may be employed. Neither do I limit myself to the exact form of sleeve shown, nor to the use of soft rubber. Any other form of cushion may be employed and other material besides rubber may be substituted without departing from the spirit of my invention.

Having thus described my invention, I claim as new and desire to secure by Letters Patent—

1. As an article of manufacture, a clip provided with a socket and with an aperture disposed adjacent to said socket for holding a locking device, and a flanged sleeve of resilient material engaging said socket and said aperture.

2. As an article of manufacture, a clip provided with a socket and with an aperture disposed adjacent to said socket for holding a locking device, and an insulating member engaging said socket and said aperture.

3. As an article of manufacture, a clip provided with a socket and with an aperture disposed adjacent to said socket for holding a locking device, and a sleeve of insulating material engaging said socket and provided with a flange disposed within said aperture.

4. As an article of manufacture, a clip provided with a socket and with an aperture communicating therewith, and an insulating member engaging both said socket and said aperture.

5. As an article of manufacture, a clip provided with a socket and with an aperture communicating therewith, and further provided with an uneven bearing-surface disposed adjacent to said socket, and a cylindrical sleeve of rubber disposed within said aperture and provided at its ends with integral rubber flanges engaging said aperture and said bearing-surface.

6. As an article of manufacture, a clip provided with a socket and with an aperture larger than said socket and communicating therewith, and an insulating-cushion of cylindrical form engaging said socket and provided integrally with a flange engaging said aperture.

7. As an article of manufacture, a clip provided with a socket for encircling a threaded bolt and with an aperture larger than said socket and communicating therewith, and lock-nuts disposed within said aperture and engaging said threaded bolt.

8. As an article of manufacture, a clip provided with a socket and with an aperture disposed adjacent to said socket for holding a locking device, and an insulating member engaging said socket and said aperture, said insulating member being thereby secured to said clip and being removable therewith.

9. As an article of manufacture, a clip provided with a cylindrical socket and with a substantially annular insulating member normally fixed within said socket and constituting a lining therefor, so as to virtually form a part of said clip and to be removable therewith.

10. As an article of manufacture, a clip provided with a socket for encircling a bolt, and with an uneven bearing-surface for engaging a cushioning member.

11. As an article of manufacture, a clip provided with a socket and with an aperture for holding a locking device, and a resilient member for engaging said socket internally and constituting a lining therefor.

12. As an article of manufacture, a clip provided with a socket and with an aperture disposed adjacent to said socket for holding a locking device, and a resilient member engaging said socket.

13. As an article of manufacture, a clip provided with a socket and with an aperture disposed adjacent to said socket for holding a locking device, and a sleeve of insulating material engaging said socket and constituting a lining therefor.

14. As an article of manufacture, a clip provided with a socket for encircling a bolt and with an uneven surface for engaging a cushioning member, said clip being further provided with an aperture for admitting a locking device.

15. As an article of manufacture, a clip provided with a socket and with a bearing-surface disposed adjacent thereto, said bearing-surface being uneven for the purpose of engaging a cushioning member.

16. As an article of manufacture, a clip provided with a socket and with a bearing-surface disposed adjacent thereto, said bearing-surface being provided with mutilations for the purpose of engaging a compressible member.

17. As an article of manufacture, a clip provided with a socket and with a bearing-surface disposed adjacent thereto, said clip being further provided with an aperture for holding a locking device.

18. As an article of manufacture, a clip provided with a socket and with an aperture adjacent to said socket for holding a locking device, and a resilient member engaging both said socket and said aperture.

19. As an article of manufacture, a clip provided with a socket, and with an aperture disposed adjacent to said socket and larger than the same, and a resilient member of proper conformity to fit both said socket and said aperture.

20. As an article of manufacture, a clip provided with an aperture, a locking device disposed within said aperture, and an insulating member disposed within said aperture and engaging said locking device.

21. As an article of manufacture, a clip provided with an aperture for holding a locking device, and a rubber cap fitted within said aperture and free to engage said locking device.

22. As an article of manufacture, a clip provided with an aperture for holding a locking device and also provided with a socket for engaging a support, and an insulating member of resilient material normally engaging said socket and said aperture and held by its own conformity within said socket.

23. As an article of manufacture, a clip provided with an aperture for holding a locking device, and a cap of insulating material disposed within said aperture.

In testimony whereof I have signed my name to this specification in the presence of two subscribing witnesses.

LOUIS STEINBERGER.

Witnesses:
WALTON HARRISON,
EVERARD BOLTON MARSHALL.